J. F. ANDERSON, Jr., AND J. C. MASTERS.
COMBINATION DRILL AND TAP.
APPLICATION FILED OCT. 7, 1920.
1,408,793.
Patented Mar. 7, 1922.
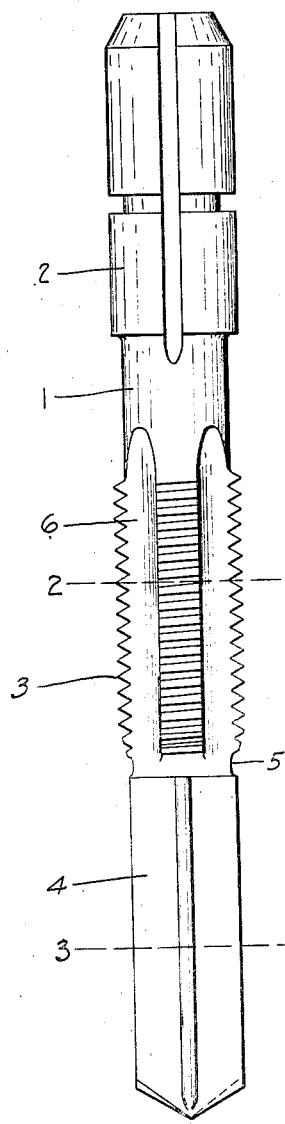
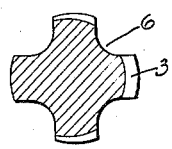
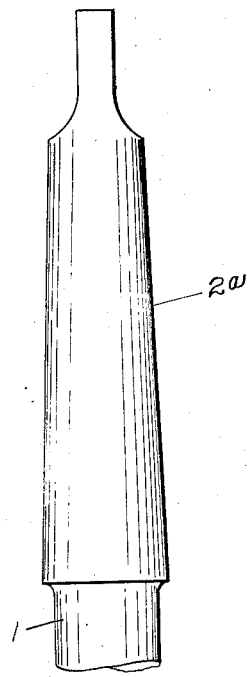
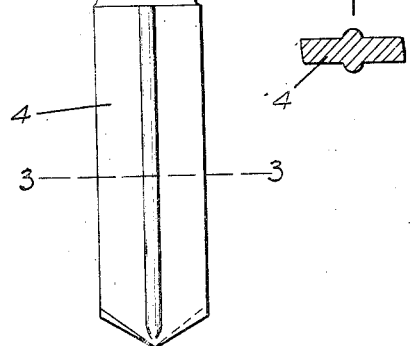
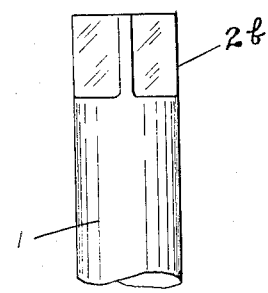
INVENTORS.
JOHN F. ANDERSON, JR.
JAMES C. MASTERS.
BY
ATTORNEYS.

UNITED STATES PATENT OFFICE.

JOHN F. ANDERSON, JR., AND JAMES C. MASTERS, OF INDIANAPOLIS, INDIANA.

COMBINATION DRILL AND TAP.

1,408,793.     Specification of Letters Patent.     Patented Mar. 7, 1922.

Application filed October 7, 1920. Serial No. 415,273.

*To all whom it may concern:*

Be it known that we, JOHN F. ANDERSON, Jr., and JAMES C. MASTERS, citizens of the United States, residing at Indianapolis, in the county of Marion and State of Indiana, have invented certain new and useful Improvements in Combination Drills and Taps, of which the following is a specification.

This invention relates to a combination drill and tap, the prime feature of the invention being the formation of a drill bit at one end of a shank and a tap above said bit for forming threads in the opening drilled by the bit, these results being accomplished in one continuous operation, thereby greatly facilitating the work and reducing the cost of production, one setting of the work in the machine serving for both drilling and tapping the same.

Other objects and advantages will be hereinafter more fully set forth and pointed out in the accompanying specification.

In the accompanying drawings which are made a part of this application,

Figure 1 is an elevation of the combined drill and tap,

Figure 2 is a sectional view thereof, as seen on line 2—2 Figure 1,

Figure 3 is a sectional view as seen on line 3—3 Figure 1,

Figure 4 is a detail elevation of a modified form of stock for the combined drill and tap, and Figure 5 is a similar view of a still different form of stock.

Referring to the drawings, 1 indicates a bit having at one end thereof a stock 2 which may be constructed in any preferred manner for entering the socket in the drill press head, said bit terminating in a tap portion 3, and said tap portion terminating in a drill section 4, the drill 4 being so constructed that when an opening is formed thereby the continued operation of the combined drill and tap will bring the tap into contact with the opening formed by the drill so as to cut threads in said opening and as this operation is continuous the setting of the work to be drilled and tapped is accomplished in one operation.

By forming the drill and tap in one piece the operation necessary in drilling and tapping an opening is greatly facilitated as the work and tap will not have to be reset as would be necessary if the two members were formed separate, consequently a great saving in time and labor is accomplished and more perfect work can be turned out as the drill and tap are always in true alignment with each other.

At the point of union between the drill and tap is formed a cavity 5 so that the shavings will readily clear from the opening being formed by the drill, the shavings from the tap clearing through grooves 6 in the face of the tap. The drill portion 4 is preferably provided on opposite faces with vertically extending reinforcing ribs which extend substantially the full length of the drill portion.

As shown in Figures 4 and 5 and designated as $2^a$ and $2^b$ respectively any design of stock may be used in connection with the combined drill and tap, consequently the tool may be used with any make of drill press.

Having thus fully described our said invention, what we claim as new and desire to secure by Letters Patent, is:

In a device of the class described, a bit portion having a stock at one end, a flat drill portion integral with the opposite end of the bit substantially rectangular in cross section, reinforcing ribs on opposite sides of the drill portion and extending vertically the length thereof, and a tap portion between the drill and stock, said device having a cavity transversely thereof between the tap and drill portion forming a chip clearing space.

In witness whereof, we have hereunto set our hands and seals at Indianapolis, Indiana, this 2nd day of October, A. D. nineteen hundred and twenty.

JOHN F. ANDERSON, JR. [L. S.]
JAMES C. MASTERS. [L. S.]

Witnesses:
CAREY S. FRYE,
M. L. SHULER.